(12) United States Patent  
Lindley et al.

(10) Patent No.: US 8,830,035 B2  
(45) Date of Patent: Sep. 9, 2014

(54) POWER CONSUMPTION MANAGEMENT FOR AN RFID READER

(75) Inventors: Scott Lindley, Redwood City, CA (US); Theodore D. Geiszler, Monte Sereno, CA (US); Kirk B. Bierach, Saratoga, CA (US)

(73) Assignee: Farpointe Data, Inc., Sunnyvale, CA (US)

( * ) Notice: Subject to any disclaimer, the term of this patent is extended or adjusted under 35 U.S.C. 154(b) by 275 days.

(21) Appl. No.: 11/174,358

(22) Filed: Jun. 30, 2005

(65) Prior Publication Data

US 2007/0001816 A1  Jan. 4, 2007

(51) Int. Cl.
*H04Q 5/22* (2006.01)
*G06K 7/10* (2006.01)
*G06K 7/00* (2006.01)

(52) U.S. Cl.
CPC .......... *G06K 7/0008* (2013.01); *G06K 7/10128* (2013.01)
USPC ...................................................... 340/10.34

(58) Field of Classification Search
USPC ................ 340/10.34, 10.51, 10.3, 10.1, 10.2, 340/10.31, 693.3, 7.32, 425.2
See application file for complete search history.

(56) References Cited

U.S. PATENT DOCUMENTS

| | | | | |
|---|---|---|---|---|
| 5,808,587 A | * | 9/1998 | Shima | 343/895 |
| 5,850,187 A | * | 12/1998 | Carrender et al. | 340/10.6 |
| 6,044,359 A | * | 3/2000 | Goodwin, III | 340/10.34 |
| 6,278,887 B1 | * | 8/2001 | Son et al. | 455/566 |
| 6,593,845 B1 | * | 7/2003 | Friedman et al. | 340/10.33 |
| 6,710,738 B2 | * | 3/2004 | Allen, Jr. | 342/357.1 |
| 6,880,093 B1 | * | 4/2005 | Lyles | 713/300 |
| 7,145,437 B2 | * | 12/2006 | Jalkanen et al. | 340/10.3 |
| 7,193,504 B2 | | 3/2007 | Carrender et al. | |
| 2004/0025097 A1 | * | 2/2004 | Lou | 714/726 |
| 2004/0034484 A1 | * | 2/2004 | Solomita et al. | 702/62 |
| 2005/0030976 A1 | * | 2/2005 | Wentink | 370/473 |
| 2005/0083181 A1 | | 4/2005 | Jalkanen et al. | |
| 2005/0225437 A1 | * | 10/2005 | Shiotsu et al. | 340/10.51 |

\* cited by examiner

*Primary Examiner* — Jennifer Mehmood
*Assistant Examiner* — Yong Hang Jiang
(74) *Attorney, Agent, or Firm* — Nixon Peabody LLP (57) ABSTRACT

Power consumption management for a radio frequency identification (RFID) reader for a radio frequency (RF) transponder system. The RF system includes an RFID device and a host. The RFID reader includes an RFID controller, an excitation signal transmitter, a response signal receiver, an optional RFID device detector, a host interface input/output, and a user interface. The method includes establishing a first power consumption level for the RFID reader, establishing a second power consumption level that is different from the first, and changing between the first level and the second level. The difference between the first level and the second level is derived from at least one technique for power consumption management. A plurality of techniques are presented. Among the potential benefits to reduced power consumption are increased energy efficiency and reduced radiated emissions. The option of choosing between power consumption levels presents unique opportunities in system design, implementation, and operation.

43 Claims, 2 Drawing Sheets

POWER CONSUMPTION MANAGEMENT FOR AN RFID READER

FIELD OF THE INVENTION

The present invention relates generally to a radio frequency transponder system having a radio frequency identification reader and a radio frequency identification device. More specifically, the present invention relates to a method and apparatus for managing the power consumption of the radio frequency identification reader.

BACKGROUND OF THE INVENTION

A radio frequency (RF) transponder system typically includes a radio frequency identification (RFID) reader and an RFID device. The system may include multiple RFID readers, multiple RFID devices, or both. The RFID device is commonly referred to as an RFID tag. The RFID device may take a number of forms including a card or a fob. The RF transponder system typically further includes a host with which the RFID readers are in communication. The host may perform a number of functions including command, control, monitoring, maintenance, and the like. Conventional operation of the RF transponder system is generally characterized by multiple operating modes including excitation, response, and read modes. The RF transponder system requires electrical power to operate in each of these modes. In particular, the RFID reader must be powered during the excitation and read modes while the RFID device must be powered during the response mode. In many RF transponder systems the RFID device is passive, that is, the RFID device lacks an internal power source or physical connection to an external power source. The passive RFID device is powered remotely by the RFID reader while the RFID device remains free of physical contact with the RFID reader. The RFID reader may be connected to an electrical power source, such as an AC power line, which powers the RFID reader. Alternatively, the RFID reader may be powered by a self-contained power source such as a disposable or rechargeable battery. The latter enables the system designer to position the RFID reader in a remote location which lacks access to an AC power outlet. For power outages, an RFID reader that is normally powered by an AC power line may have a battery backup to enable continued operation during the power outage. Currently, there are a arrange of RFID readers available on the market. Most of the particular attributes will not be elaborated upon here. The attribute of interest here is that of power consumption and the management thereof. Of course, power can be measured in several different ways including peak and average. How one chooses to measure power is not of exact interest here except of course that any measure be comparable from one device to another. Whatever the measure, each RFID reader on the market today has a particular level of power consumption. The levels of power consumption may vary from one device to another. The level of power consumption is set by the manufacturer of the device. There is only one level of power consumption per device. This state of affairs limits the ability of one to manage, as may be desired or required, the power consumption of the RFID reader after being manufactured.

BRIEF SUMMARY OF THE INVENTION

A method and apparatus for power consumption management of a radio frequency identification (RFID) reader is disclosed. The RFID reader is part of a radio frequency (RF) transponder system that further includes an RFID device and a host. The RFID reader includes an RFID controller, an excitation signal transmitter, a response signal receiver, an optional RFID device detector, a host interface input/output, and a user interface. The method includes establishing a first power consumption level for the RFID reader, establishing a second power consumption level that is different from the first, and changing between the first level and the second level. The difference between the first level and the second level is derived from at least one technique for power consumption management. A plurality of techniques are presented. Among the potential benefits to reduced power consumption are increased energy efficiency and reduced radiated emissions. The option of choosing between power consumption levels presents unique opportunities in system design, implementation, and operation.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION OF THE INVENTION

Various exemplary embodiments of the present invention are described herein in the context of a method and apparatus for power consumption management of an RFID reader. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

One of ordinary skill in the art will recognize that there any number of applications for RF transponder systems. Some concern inanimate objects such as bins or boxes and some concern animate objects such as people or pets. The discussion that follows is not intended to be necessarily limited to any one application despite the use of examples. Those of ordinary skill will readily formulate other examples based on those that follow. One commonly experienced application is a security system that controls access to a building or rooms within a building. Typically a locked door is provided with an RFID reader on one or both sides of the door. The RFID reader has the ability to control or direct the control of the lock on the door. An authorized user is issued an RFID device such as a card. To gain access, the user presents the card to the RFID reader where the reader reads the card, authenticates the user, and releases the door lock. The time that it takes between the moment that the user presents the card and the moment that the reader releases the door lock is referred to as the transaction time. From the user's perspective, the shorter that the transaction time is the better. Depending on the circumstances however, the interest of the user may not be paramount and transaction times may be longer than the theoretical minimum.

One circumstance that may take precedence over user desires is that of power consumption. Either by choice or by necessity, power consumption of an RFID reader may be reduced. Potential benefits to reduced power consumption include increased energy efficiency and reduced radiated emissions. At the present, the level of power consumption is dictated by the manufacturer of the device and is static. The present invention enables a degree of dynamics that is not currently available. One potential shortfall to reducing the power consumption is that it may detrimentally impact transaction times in one way or another. In theory, power consumption may vary over a continuum from high power consumption to low or ultra low power consumption. In practice, power consumption according to the present invention may vary in distinct steps or levels. There may be as few as two steps, that is, a first, high, or higher power consumption level and a second, low, or lower power consumption level. The levels are relative to one another and may only be relevant to the specific device and may not be directly comparable from device to device, that is, high for a first device may not be the same high for a second device. The option of choosing between or among power consumption levels presents unique opportunities in system design, implementation, and operation.

Continuing with the security system application, some example instances of power consumption management will be presented. Assume for the following that there is one locked door with an RFID reader on both sides of the door to control the lock. Further, assume that each reader is capable of two power consumption levels. It may or may not be the case that one reader is consuming power at the same level as the other reader. Each reader may be independently managed depending on the circumstances. For discussion purposes, one reader may be referred to as the ingress or entry reader and the other may be referred to as the egress or exit reader. The following four examples might be loosely grouped into two for normal operation and two for emergency operation. For each group, there is one example where the power consumption level goes from high to low and one example where the power consumption level goes from low to high. Although each example is presented separately, combinations would also be possible as desired or required.

The first example will be referred to as peak versus off-peak time. The power consumption is managed based on a determination of when peak usage periods regularly occur. The power consumption level is then set high for peak times and low for off-peak times. For example, a business might consider peak usage to be their business hours. If so, then the power consumption level is set high during the day on business days and low at night and on weekends. Of course more advanced determinations might also be possible based on, for example, breaks, meal times, or shift changes. Further still, determinations might be based on directions of traffic such as outbound at the start of breaks and meal times or at the end of a shift and inbound at the end of breaks and meal times or at the beginning of a shift.

The second example will be referred to as high versus low demand frequency. The power consumption is managed based on actual usage. The default power consumption level is set to low. Then when the demand frequency reaches a predetermined threshold, the power consumption level is set to high. This high level may be maintained for a set period of time or until the demand frequency drops again. The high level allows for quicker transaction times for groups of users while the low level reduces power consumption during lulls in demand. One tradeoff is that the individual user and the first few users in a group may experience longer transaction times. One reader may be controlled independently of the other reader. Demand frequency may be used in addition to or in place of peak time determinations as outlined above.

The third example will be referred to as a power outage emergency. Prior to the power outage, the power consumption level may be high or low depending on the normal operation. During the power outage, the power consumption level may default at some point to low or lower. The point and length of default may depend on a number of factors including time and backup power reserve levels. Recall that currently the power consumption level is fixed. Thus if the level for the reader is high before the power outage, then it will remain high after the power outage. A high power consumption level may quickly drain backup power reserves. Conversely, if, as according to the present invention, the power consumption level is changed to low, then the backup power reserves may be preserved for a longer period of power outage. In fact, if the power consumption level is appropriate, then it would be possible to power the readers, either continuously or on demand, from a central location during the power outage. Given the potentially limited backup power reserves, it may be desirable to implement several power consumption levels in the readers to further adjust to backup power reserves. It may be that even extremely long transaction times are preferred to no access whatsoever.

The fourth example will be referred to as an evacuation emergency. In this example, it is assumed that some emergency such as a natural or a man-made threat necessitates the evacuation of users from the area behind the locked door. To maintain security, egress wants to be expedited, while ingress wants to continue to be controlled. Thus, simply unlocking the door in both directions may not be an option. Further, in an effort to account for all of the users, it may be desirable to have a user activate the door from the inside in an attempt to identify their location at any particular time during the emergency. This information might be used to direct search and rescue resources. As above, prior to the evacuation, the power consumption level may be high or low depending on the normal operation. During the evacuation, the power consumption level might default at some point to high. The point and length of default may depend on a number of factors including time and the type of emergency. For example, in a building fire it might be desirable to shut off unnecessary power as soon as is realistic to reduce the spread of the fire. It is important of course to get as many users as possible out first. At least for a short period of time, minimizing transaction times may be a higher priority than fire suppression and certainly a higher priority than power conservation.

In an effort to facilitate power consumption management for the RFID reader, a number of techniques have been devised and will be disclosed below. These techniques may be used individually or in combination depending on the circumstances. Three decision factors for selecting between and among these techniques will be presented. Other decision factors may be evident to those of ordinary skill in the art. The three primary factors that may be considered are transaction time, read range, and user interface. Transaction time was outlined previously. Read range refers to how close the RFID device must be to the RFID reader. Users generally prefer longer, farther, or more distant read ranges to shorter, closer, or less distant read ranges. User interface refers to any arrangement that produces one or more outputs such as visual, audible, mechanical, or electrical outputs or that accepts one or more user inputs such as a physical or voice recognition or a button push or keystroke. Users generally prefer quick and clear interfaces to slow and vague interfaces.

Figure 1:
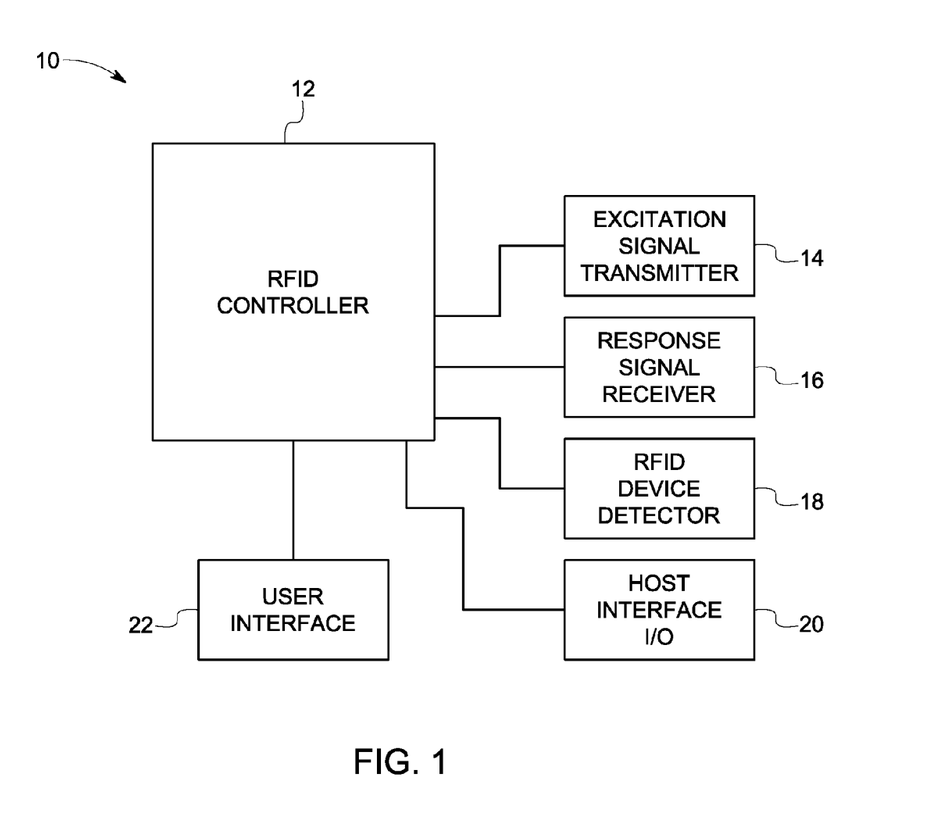
FIG. 1 is a block diagram of an RFID reader according to the present invention.

Turning now to FIG. 1, a block diagram of an RFID reader (reader) 10 according to the present invention is shown. The diagram has been simplified to include primarily elements of the reader 10 that will be relevant to the discussion that follows. One of ordinary skill in the art will readily identify other elements that might also be included as desired or required. The identity and organization of the exemplary elements may not be strictly as shown. The signal traffic on the various lines may be unidirectional or bidirectional and more or different lines may be included. The various elements may be separated, combined, or reordered without departing substantially from the inventive concepts described herein. The reader 10 includes an RFID controller (controller) 12, an excitation signal transmitter (exciter) 14, a response signal receiver (receiver) 16, an optional RFID device detector (detector) 18, a host interface input/output (host interface) 20, and a user interface 22. Below, each element will be discussed further in turn.

The controller 12 performs a number of functions for the reader 10. Included among these functions are generation of the excitation signal, demodulation of the response signal, reception of a detection signal, interaction with the host interface, and interaction with the user interface. Although the controller 12 is depicted as being a single unit, this would not necessarily be the case. If the controller 12 is broken into a number of sub-units, then power consumption management may be performed on one or more of the sub-units. In either case, one technique for power consumption management is to sleep the controller 12. Depending on the circumstances, there may be degrees of sleep to choose from for the controller 12. In general, a sleep state would be any state where the controller 12 is operating at less than full power. The initiation, duration, and termination of the sleep state may be controlled by many factors and actors. For example, the sleep state may be programmed into the reader 10 based on a certain clock cycle, that is, sleep for three periods and wake for two periods or sleep for one period and wake for three periods. Likewise, the sleep state may be based on the occurrence of a specified event or sequence of events such as the presentation of a card (not shown), that is, sleep until a card is presented and then awaken. To facilitate the detection of the presence of a card, the reader 10 may be equipped with the detector 18. One potential drawback to the detector 18 is that read ranges may be reduced. Card detection will be discussed further below. When the technique of sleeping the controller 12 is employed, the transaction times may be lengthened and the user interface 22 may at least appear degraded to the user.

The exciter 14 transmits one or more signals for the reader 10. One signal is the excitation signal and another may be a detection signal. The latter may be employed when the reader 10 is equipped with the optional detector 18. In either case, the exciter 14 includes a transmitter antenna and circuit. The exciter 14 is pulsed on and off. For maximum read range, the exciter 14 is constantly pulsed on and off at a maximum voltage level. This should give the best transaction time. One technique for power consumption management is to reduce the time that the exciter 14 is pulsed on and off, that is, pulsing something less than constantly. This may reduce read ranges or increase transaction times. Another technique is to reduce the voltage level at which the exciter 14 is pulsed, that is, something less than maximum. Two or more voltage levels would provide options not currently available. One embodiment of this technique would be to provide multiple resistors that can be switched in or out of the exciter circuit. As above, this technique may reduce read ranges or increase transaction times. Neither exciter technique should degrade the user interface 22.

The receiver 16 receives one or more signals for the reader 10. One signal is the response signal from the RFID device. The receiver 16 includes a receiver antenna and circuit. The receiver 16 is usually tuned to a particular frequency or range of frequencies appropriate to the application. The receiver 16 is typically constantly powered. This should give the best transaction time. One technique for power consumption management is to reduce the time that the receiver 16 is powered, that is, something less than constantly. The initiation, duration, and termination of the powered state of the receiver 16 may be controlled by many factors and actors. For example, the powered state may be programmed into the reader 10 based on a certain clock cycle, that is, power up for ten periods and power down for ten periods. Likewise, the powered state may be based on the occurrence of a specified event or sequence of events. One such event may be the detection of a card, that is, power down until a card is detected and then power up to read the card. As above, to facilitate the detection of the presence of a card, the reader 10 may be equipped with the detector 18. Another such event may be the state of the exciter 14. For a passive RFID device, there is no response signal to be received if there is not an excitation signal being transmitted by the exciter 14. So the receiver 16 and the exciter 14 may be coordinated in one of several manners. One embodiment of this technique would be to tie into the exciter clock signal. Another embodiment would be to provide a command line from the controller 12 to the receiver 16. Either embodiment may require additional circuitry be added to the reader 10. It is also possible to combine the exciter 14 and the receiver 16 into one block. This can be accomplished by including only one combination transmitter and receiver antenna and appropriate circuitry. One potential drawback with powering down the receiver 16 is that the receiver 16 may experience a delay during power up, that is, reception may not be possible immediately upon power up. The delay, once identified, can be diminished by careful circuit design and layout. The delay may negatively impact transaction time. None of these receiver techniques should impact read ranges or the user interface 22.

The optional detector 18 facilitates the detection of the presence of a card in proximity to the reader 10. In this discussion, the detector 18 may take one of two basic forms. First, the detector 18 may take the form of dedicated electrical circuitry that has been added to the reader 10 for detection purposes. Second, the detector 18 may take the form of a method that employs existing circuitry or modified existing circuitry to perform a detection function. Generally, the detector 18 may enable greater efficiencies than a conventional high power consumption reader. Recall that conventional operation of the system is generally characterized by multiple operating modes including excitation, response, and read modes. The detector 18 allows for the addition of a detection mode to these three modes. The detection mode permits select portions of the reader 10 to be placed in an energy saving state which will be referred to here as a detection sleep state. How exactly the detection sleep state will manifest itself in practice depends on the circumstances. For example, as eluded to above, the controller 12 and the receiver 16, among others, might be powered off during detection mode and powered on during one or more of the other three modes. The circuitry form of the detector 18 may be one of several different designs. One approach is to search for an increased voltage level within the frequency range of the response signal. This is typically accomplished by a received signal strength indicator circuit. This approach does not read any data per se. Generally, the circuit embodiments of the detector 18 may result in shorter read ranges and longer transaction times. The method form of the detector 18 may also be one of several different designs. One approach is to read a burst of data, that is, less than the entire data stream but sufficient amounts of data to be indicative of the presence of a card. Another approach is not to actually read data but to detect the presence of the modulation pattern that is generated by the card. Sufficient amounts of modulation alone at one or more specific frequencies can be indicative of the presence of a card. For example, in an FSK type system where a card modulates at two frequencies, that is, RF/10 for a logic zero and RF/12 for a logic one, with a certain number of clock cycles per bit, say five clocks per bit time, it is possible to detect card presence by sampling the receive signal and determining whether or not enough successive receive clocks are present in a row at RF/10 or RF/12 to indicate a high probability of card presence. If the receive clocks are seen, then the reader 10 can transition to the read mode, where card data is demodulated and stored into memory for further processing before sending to the host. The advantage to this modulation approach is that it uses less exciter energy as the modulation can be detected before any significant data is read. Generally, the method embodiments of the detector 18 may result in longer transaction times. None of these detector techniques should impact the user interface 22.

The host interface 20 receives or transmits one or more signals between the reader 10 and a host (not shown). The host is a central processing device that controls and directs the system that includes the reader 10. The signals may take many forms including digital or analog, serial or parallel, and periodic or random. The host interface 20 is typically constantly powered. This should give the best overall performance. One technique for power consumption management is to reduce the time that the host interface 20 is powered, that is, something less than constantly. The initiation, duration, and termination of the powered state of the host interface 20 may be controlled by many factors and actors. For example, the powered state may be programmed into the reader 10 based on a certain clock cycle, that is, power up for one period and power down for one period. Likewise, the powered state may be based on the occurrence of a specified event or sequence of events. One such event may be the detection of a card, that is, power down until a card is detected and then power up to transmit the card data to the host. As above, to facilitate the detection of the presence of a card, the reader 10 may be equipped with the detector 18. Another such event may be the state of the receiver 16. If the activity of the receiver 16 is given controlling influence, then when the receiver 16 is powered down, the host interface 20 can be powered down accordingly. This example may be too rudimentary as the host interface 20 may transfer a number of signals irregardless of the activity of the receiver 16. For example, the host may directly control or monitor one or more elements of the controller 12 or the user interface 22. If so, then when the host interface 20 is powered down, these elements or features may not operate properly. Consequently, considerations such as these may influence the choice of power management techniques employed for the host interface 20. Generally, none of these host interface techniques should impact the read range. Conversely, the transaction times may be increased and the user interface 22 may be degraded.

The user interface 22 produces one or more outputs or receives one or more inputs for the reader 10. The user interface 22 is typically constantly powered. This should give the best overall performance. One technique for power consumption management is to reduce the time that the user interface 22 is powered, that is, something less than constantly. The initiation, duration, and termination of the powered state of the user interface 22 may be controlled by many factors and actors. For example, the powered state may be programmed into the reader 10 based on a certain clock cycle, that is, power up for three periods and power down for two periods. Likewise, the powered state may be based on the occurrence of a specified event or sequence of events. One such event may be the detection of a card, that is, sleep until a card is presented and then awaken. As above, to facilitate the detection of the presence of a card, the reader 10 may be equipped with the detector 18. The major concern to user interface techniques for power consumption management is the reaction of the user. If possible, one may choose to degrade the user interface 22 last and then only in steps. It is likely that at no point does the user interface 22 want to appear to be completely inactive for excessive periods of time. For example, if there is an LED, then for power savings it may be set to blink periodically rather than light constantly. During battery operation, power savings may be much more important than user convenience. The exact options will depend on the circumstances and the potential user reactions. Generally, none of these user interface techniques should impact the read range. Conversely, the transaction times may be increased.

Beyond the specific elements presented above with respect to FIG. 1, more general features of power consumption management for RFID readers will now be discussed. These features may be used individually or in combination and may apply to one or more of the elements of FIG. 1. One feature is the actor establishing or controlling the power consumption management. The actor may be a person, a machine, or both. As implied in the examples above, the manufacturer may establish two or more power levels or techniques for the reader. These may be chosen at the discretion of the manufacturer or may be specified by the customer. The system designer, installer, administrator, and the like may in turn choose between or among such options. For example, the manufacturer may provide five options, but the system may only utilize two of the five. Further, the actor may choose when to change between power levels or may set conditions under which such a change will be automatically made. For example, the time for periodic changes may be set. In certain circumstances, the user may be an actor as well. The various conditions or parameters relevant to the conditions may be sensed directly by the reader or indirectly by an external device that in turn informs the reader as desired or required. It may be desirable for the host or other elements of the system to know or be able to ascertain the power consumption level of the reader. For example, the reader may make known its power level or changes in power level. Likewise, the reader may respond to inquiries as to its power level.

Another feature is the means for power consumption management. The primary means to change from one power level to another is a switch. The switch may take many tangible forms including a push button, a rotary dial, a control card, a control key, and the like. The switch may take many less tangible forms including a command over a line or bus. Combinations are also possible. Other means such as ASICs, FPGAs, DSPs, and the like may also be employed.

Another feature is the occasion for power consumption management. As has been eluded to in the above examples, a change from one power level to another may occur based on one or more constant such as time. The time may be a scheduled moment or a selected quantity or ratio. Further, the change may be based on one or more variables such as the power reserves or the level of demand. Combinations are also possible. The reader may be adapted to learn over time the occasion for change based upon empirical data. A plurality of readers may be enabled to learn from one another over time.

Figure 2:
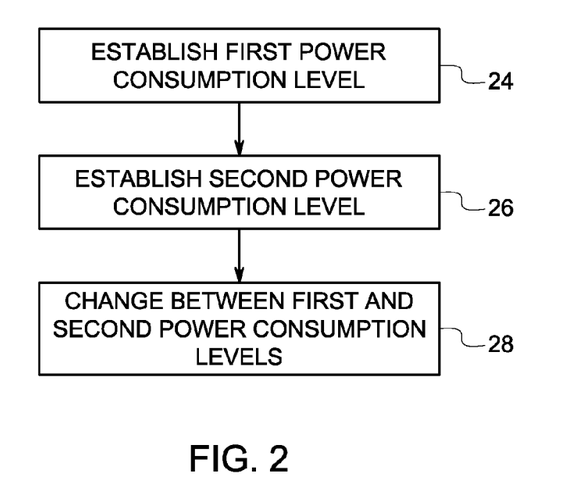
FIG. 2 is a block diagram according to the present invention of a method of power consumption management for the RFID reader for FIG. 1.

Turning now to FIG. 2, a block diagram according to the present invention of a method of power consumption management for the RFID reader 10 for FIG. 1 is shown. At block 24, a first power consumption level is established for the RFID reader 10. At block 26, a second power consumption level is established for the RFID reader 10. The second level is different from the first. The second level may be higher or lower than the first depending on the circumstances. The difference between the two levels is derived from at least one of the techniques for power consumption management outlined above. More than two power consumption levels may be established. If established, they may be derived from the same technique or from one or more different techniques. At block 28, the power consumption level of the RFID reader 10 is changed between the first and second levels. If more than two power consumption levels have been established, then switching may be done directly from one level to another or it may be done in a sequence such as a chain or a loop.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

The invention claimed is:

1. A radio frequency identification (RFID) reader for a radio frequency (RF) transponder system, the RF system including the RFID reader, an RFID device, and a host, the RFID reader comprising:
an RFID controller;
an excitation signal transmitter coupled to the RFID controller;
a response signal receiver coupled to the RFID controller;
a host interface coupled to the RFID controller, the host interface configured to be coupled to a host and configured to be powered down; and
a user interface coupled to the RFID controller,
wherein at least one of the host interface and the user interface is configured to access an input of the RFID reader to select at least one technique for power consumption management from among a plurality of power consumption management techniques available to the RFID reader, each power consumption management technique operative to reduce power consumption of the RFID reader for a set of one or more operations of the RFID reader,
wherein the RFID reader is configured to change between a first power consumption management technique and a second power consumption management technique different from the first responsive to the input, the first and second power consumption management techniques operative to manage power consumption of the RFID reader at different levels for the same set of one or more operations of the RFID reader, and
wherein the plurality of power consumption management techniques includes reducing a time at least one of the RFID controller, the excitation signal transmitter, and the response signal receiver remains powered, and reducing a time that the host interface is powered in response to a command received by the host interface from the host.

2. A radio frequency identification (RFID) reader for a radio frequency (RF) transponder system, the RF system including the RFID reader, an RFID device, and a host, the RFID reader comprising:
an RFID controller;
an excitation signal transmitter coupled to the RFID controller;
a response signal receiver coupled to the RFID controller;
a host interface coupled to the RFID controller, the host interface configured to be coupled to a host and configured to be powered down; and
a user interface coupled to the RFID controller,
wherein at least one of the host interface and the user interface is configured to access an input of the RFID reader to select at least one technique for power consumption management from among a plurality of power consumption management techniques available to the RFID reader, each power consumption management technique operative to reduce power consumption of the RFID reader for a set of one or more operations of the RFID reader,
wherein the RFID reader is configured to change between a first power consumption management technique and a second power consumption management technique different from the first responsive to the input, the first and second power consumption management techniques operative to manage power consumption of the RFID reader at different levels for the same set of one or more operations of the RFID reader, wherein the second power consumption level is associated with a sleep mode of the RFID controller, and
wherein the plurality of power consumption management techniques includes reducing a time at least one of the RFID controller, the excitation signal transmitter, and the response signal receiver remains powered, and reducing a time that the host interface is powered in response to a command received by the host interface from the host.

3. The RFID reader of claim 1, wherein the second power consumption level is associated with a mode in which a second voltage level applied to the excitation signal transmitter is lower than a first voltage level associated with a first power consumption level.

4. The RFID reader of claim 1, wherein the first power consumption level is associated with a mode in which the response signal receiver remains powered for a first period after it is activated and the second power consumption level is associated with a mode in which the response signal receiver remains powered for a second period of time less than the first period of time after it is activated.

5. The RFID reader as defined in claim 1, wherein the selected at least one technique for power consumption management is to reduce a time that the excitation signal transmitter is powered on and coordinate the powering of the response signal receiver to that of the excitation signal transmitter.

6. A radio frequency identification (RFID) reader for a radio frequency (RF) transponder system, the RF system including the RFID reader, an RFID device, and a host, the RFID reader comprising:
an RFID controller;
an excitation signal transmitter coupled to the RFID controller;
a response signal receiver coupled to the RFID controller;
a host interface coupled to the RFID controller, the host interface configured to be coupled to a host and configured to be powered down; and
a user interface coupled to the RFID controller,
wherein at least one of the host interface and the user interface is configured to access an input of the RFID reader to select at least one technique for power consumption management from among a plurality of power consumption management techniques available to the RFID reader, each selected power consumption management technique operative to reduce power consumption of the RFID reader for a set of one or more operations of the RFID reader, and
wherein the RFID reader is configured to change between a first power consumption management technique and a second power consumption management technique different from the first responsive to the input, the first and second power consumption management techniques operative to manage power consumption of the RFID reader at different levels for the same set of one or more operations of the RFID reader; and
an RFID device detector coupled to the RFID controller,
wherein the RFID device detector ascertains the presence of the RFID device by sampling a receive signal and determining whether a sufficient number of successive receive clocks are present in a row at a select frequency,
wherein the selected at least one technique for power consumption management is to place the RFID reader in a detection sleep state until the RFID device is detected to be in proximity to the RFID reader, and
wherein the plurality of power consumption management techniques includes reducing a time at least one of the RFID controller, the excitation signal transmitter, and the response signal receiver remains powered, and reducing a time that the host interface is powered in response to a command received by the host interface from the host.

7. A radio frequency identification (RFID) reader for a radio frequency (RF) transponder system, the RF system including the RFID reader, an RFID device, and a host, the RFID reader comprising:
an RFID controller;
an excitation signal transmitter coupled to the RFID controller;
a response signal receiver coupled to the RFID controller;
a host interface coupled to the RFID controller, the host interface configured to be coupled to a host and configured to be powered down; and
a user interface coupled to the RFID controller,
wherein at least one of the host interface and the user interface is configured to access an input of the RFID reader to select at least one technique for power consumption management from among a plurality of power consumption management techniques available to the RFID reader, each power consumption management technique operative to reduce power consumption of the RFID reader for a set of one or more operations of the RFID reader,
wherein the RFID reader is configured selected to change between a first power consumption management technique and a second power consumption management technique different from the first responsive to the input, the first and second power consumption management techniques operative to manage power consumption of the RFID reader at different levels for the same set of one or more operations of the RFID reader, wherein the selected at least one technique for power consumption management reduces a time that the host interface input/output is powered on, and
wherein the plurality of power consumption management techniques includes reducing a time at least one of the RFID controller, the excitation signal transmitter, and the response signal receiver remains powered, and reducing a time that the host interface is powered in response to a command received by the host interface from the host.

8. A radio frequency identification (RFID) reader for a radio frequency (RF) transponder system, the RF system including the RFID reader, an RFID device, and a host, the RFID reader comprising:
an RFID controller;
an excitation signal transmitter coupled to the RFID controller;
a response signal receiver coupled to the RFID controller;
a host interface coupled to the RFID controller, the host interface configured to be coupled to a host and configured to be powered down; and
a user interface coupled to the RFID controller,
wherein at least one of the host interface and the user interface is configured to access an input of the RFID reader to select at least one technique for power consumption management from among a plurality of power consumption management techniques available to the RFID reader, operative to reduce power consumption of the RFID reader for a set of one or more operations of the RFID reader,
wherein the RFID reader is configured to change between a first power consumption management technique and a second power consumption management technique different from the first responsive to the input, the first and second power consumption management techniques operative to manage power consumption of the RFID reader at different levels for the same set of one or more operations of the RFID reader, wherein the selected at least one technique for power consumption management reduces a time that the response signal receiver is powered on and coordinates the powering of the host interface input/output to that of the response signal receiver, and
wherein the plurality of power consumption management techniques includes reducing a time at least one of the RFID controller, the excitation signal transmitter, and the response signal receiver remains powered, and reducing a time that the host interface is powered in response to a command received by the host interface from the host.

9. The RFID reader as defined in claim 1, wherein the selected at least one technique for power consumption management is to reduce a time that the user interface is powered on.

10. The RFID reader as defined in claim 1, wherein the selected at least one technique for power consumption management is peak versus off-peak time wherein the first power consumption level is used during peak times and the second power consumption level is used during off-peak times.

11. The RFID reader as defined in claim 1, wherein the selected at least one technique for power consumption management is high versus low demand frequency wherein the first power consumption level is used during high demand frequency times and the second power consumption level is used during low demand frequency times.

12. The RFID reader as defined in claim 1, wherein the selected at least one technique for power consumption management is a power outage emergency wherein the first power consumption level is used during normal power times and the second power consumption level is used during power outage times.

13. The RFID reader as defined in claim 12, wherein the second power consumption level for the RFID reader is such that power can be supplied to the RFID reader at least in part by the host.

14. The RFID reader as defined in claim 1, wherein the selected at least one technique for power consumption management is an emergency wherein the first power consumption level is used during normal times and the second power consumption level is used during emergency times.

15. The RFID reader as defined in claim 1, wherein the selected at least one technique for power consumption management includes a condition that is sensed by the RFID reader.

16. The RFID reader as defined in claim 1, wherein the selected at least one technique for power consumption management includes a condition that is sensed by an external device and communicated to the RFID reader.

17. The RFID reader as defined in claim 1, wherein the selected at least one technique for power consumption management includes a dynamic condition that is customized by the RFID reader based on empirical data.

18. The RFID reader as defined in claim 1, wherein a present power consumption level of the RFID reader is made known to one or more elements of the RF system.

19. The RFID reader as defined in claim 1, wherein a change in power consumption level of the RFID reader is made known to one or more elements of the RF system.

20. The RFID reader as defined in claim 1, wherein a change in the power consumption level of the RFID reader is accomplished through the use of at least one of a switch, a push button, a rotary dial, a control card, or a control key.

21. The RFID reader as defined in claim 1, wherein a change in the power consumption level of the RFID reader is accomplished at least in part through a command from the host to the RFID reader.

22. A method for power consumption management for a radio frequency identification (RFID) reader for a radio frequency (RF) transponder system, the RF system including the RFID reader, an RFID device, and a host, the RFID reader including an RFID controller, an excitation signal transmitter, a response signal receiver, a host interface, and a user interface, the method comprising:
responsive to an input from at least one of the host interface and the user interface, selecting a first technique for power consumption management to reduce power consumption, the first technique establishing a first power consumption level at which a selected set of one or more operations of the RFID reader occur; and
selecting a second technique for power consumption management to reduce power consumption, the second technique establishing a second power consumption level, different from the first, at which the selected set of one or more operations of the RFID reader occur,
wherein at least one of the first technique for power consumption management and the second technique for power consumption management includes reducing a time at least one of the RFID controller, the excitation signal transmitter, and the response signal receiver remains powered, and reducing a time that the host interface is powered in response to a command received by the host interface from the host.

23. A method for power consumption management for a radio frequency identification (RFID) reader for a radio frequency (RF) transponder system, the RF system including the RFID reader, an RFID device, and a host, the RFID reader including an RFID controller, an excitation signal transmitter, a response signal receiver, a host interface, and a user interface, the method comprising:
responsive to an input from at least one of the host interface and the user interface, selecting a first technique for power consumption management to reduce power consumption, the first technique establishing a first power consumption level at which a selected set of one or more operations of the RFID reader occur; and
selecting a second technique for power consumption management to reduce power consumption, the second technique establishing a second power consumption level, different from the first, at which the selected set of one or more operations of the RFID reader occur,
wherein the selected first technique controls a sleep mode of the RFID controller, and
wherein at least one of the first technique for power consumption management and the second technique for power consumption management includes reducing a time at least one of the RFID controller, the excitation signal transmitter, and the response signal receiver remains powered, and reducing a time that the host interface is powered in response to a command received by the host interface from the host.

24. The method as defined in claim 22, wherein the selected at least one technique for power consumption management is to change between a first voltage level and a second voltage level at which the excitation signal transmitter is pulsed.

25. The method as defined in claim 22, wherein the selected at least one technique for power consumption management is to reduce a time that the response signal receiver is powered on.

26. The method as defined in claim 22, wherein the selected at least one technique for power consumption management is to reduce a time that the excitation signal transmitter is powered on and coordinate the powering of the response signal receiver to that of the excitation signal transmitter.

27. A method of power consumption management for a radio frequency identification (RFID) reader for a radio frequency (RF) transponder system, the RF system including the RFID reader, an RFID device, and a host, the RFID reader including an RFID controller, an excitation signal transmitter, a response signal receiver, a host interface, and a user interface, the method comprising:
responsive to an input from at least one of the host interface and the user interface, selecting a first technique for power consumption management to reduce power consumption, the first technique establishing a first power consumption level at which a selected set of one or more operations of the RFID reader occur; and
selecting a second technique for power consumption management to reduce power consumption, the second technique establishing a second power consumption level, different from the first, at which the selected set of one or more operations of the RFID reader occur, wherein the RFID reader further comprises an RFID device detector, wherein the RFID device detector ascertains the presence of the RFID device by sampling a receive signal and determining whether a sufficient number of successive receive clocks are present in a row at a select frequency, wherein the selected first technique places the RFID reader in a detection sleep state until the RFID device is detected to be in proximity to the RFID reader, and wherein at least one of the first technique for power consumption management and the second technique for power consumption management includes reducing a time at least one of the RFID controller, the excitation signal transmitter, and the response signal receiver remains powered, and reducing a time that the host interface is powered in response to a command received by the host interface from the host.

28. A method of power consumption management for a radio frequency identification (RFID) reader for a radio frequency (RF) transponder system, the RF system including the RFID reader, an RFID device, and a host, the RFID reader including an RFID controller, an excitation signal transmitter, a response signal receiver, a host interface, and a user interface, the method comprising:

responsive to an input from at least one of the host interface and the user interface, selecting a first technique for power consumption management to reduce power consumption, the first technique establishing a first power consumption level at which a selected set of one or more operations of the RFID reader occur; and selecting a second technique for power consumption management to reduce power consumption, the second technique establishing a second power consumption level, different from the first, at which the selected set of one or more operations of the RFID reader occur, wherein the selected first technique reduces a time that the host interface is powered on based on a command from the host, and wherein at least one of the plurality of power consumption management techniques is associated with reducing a time at least one of the RFID controller, the excitation signal transmitter, and the response signal receiver remains powered.

29. A method of power consumption management for a radio frequency identification (RFID) reader for a radio frequency (RF) transponder system, the RF system including the RFID reader, an RFID device, and a host, the RFID reader including an RFID controller, an excitation signal transmitter, a response signal receiver, a host interface, and a user interface, the method comprising:

responsive to an input from at least one of the host interface and the user interface, selecting a first technique for power consumption management to reduce power consumption, the first technique establishing a first power consumption level at which a selected set of one or more operations of the RFID reader occur; and selecting a second technique for power consumption management to reduce power consumption, the second technique establishing a second power consumption level, different from the first, at which the selected set of one or more operations of the RFID reader occur, wherein the selected first technique reduces a time that the response signal receiver is powered on and coordinates the powering of the host interface to that of the response signal receiver and wherein the second technique establishing a second power consumption level includes selecting a power level of the host interface based on a command received from the host.

30. The method as defined in claim 22, wherein the selected at least one technique for power consumption management is to reduce a time that the user interface is powered on.

31. The method as defined in claim 22, wherein the selected at least one technique for power consumption management is peak versus off-peak time wherein the first power consumption level is used during peak times and the second power consumption level is used during off-peak times.

32. The method as defined in claim 22, wherein the selected at least one technique for power consumption management is high versus low demand frequency wherein the first power consumption level is used during high demand frequency times and the second power consumption level is used during low demand frequency times.

33. The method as defined in claim 22, wherein the selected at least one technique for power consumption management is a power outage emergency wherein the first power consumption level is used during normal power times and the second power consumption level is used during power outage times.

34. The method as defined in claim 33, wherein the second power consumption level for the RFID reader is such that power can be supplied to the RFID reader at least in part by the host.

35. The method as defined in claim 22, wherein the selected at least one technique for power consumption management is an emergency wherein the first power consumption level is used during normal times and the second power consumption level is used during emergency times.

36. The method as defined in claim 22, wherein the selected at least one technique for power consumption management includes a condition that is sensed by the RFID reader.

37. The method as defined in claim 22, wherein the selected at least one technique for power consumption management includes a condition that is sensed by an external device and communicated to the RFID reader.

38. The method as defined in claim 22, wherein the selected at least one technique for power consumption management includes a dynamic condition that is customized by the RFID reader based on empirical data.

39. The method as defined in claim 22, wherein a present power consumption level of the RFID reader is made known to one or more elements of the RF system.

40. The method as defined in claim 22, wherein a change in power consumption level of the RFID reader is made known to one or more elements of the RF system.

41. The method as defined in claim 22, wherein the change in the power consumption level is accomplished through the use of at least one of a switch, a push button, a rotary dial, a control card, or a control key.

42. The method as defined in claim 22, wherein the change in the power consumption level is accomplished at least in part through a command from the host to the RFID reader.

43. A radio frequency identification (RFID) reader for a radio frequency (RF) transponder system, the RF system including the RFID reader, an RFID device, and a host, the RFID reader comprising:

means for selecting a first technique for power consumption management to reduce power consumption responsive to an input from at least one of the host interface and the user interface, the first technique establishing a first power consumption level at which a selected set of one or more operations of the RFID reader occur; and means for selecting a second technique for power consumption management to reduce power consumption, the second technique establishing a second power consumption level, different from the first, at which the selected set of one or more operations of the RFID reader occur, wherein at least one of the first technique for power consumption management and the second technique for power consumption management includes reducing a time at least one of the RFID controller, the excitation signal transmitter, and the response signal receiver remains powered, and reducing a time that the host interface is powered in response to a command received by the host interface from the host.

* * * * *